(12) United States Patent
Poijärvi et al.

(10) Patent No.: US 6,761,749 B1
(45) Date of Patent: Jul. 13, 2004

(54) METHOD FOR THE PRODUCTION OF BLISTER COPPER IN SUSPENSION REACTOR

(75) Inventors: Jaakko Poijärvi, Horsmakuja (FI); Tarmo Mäntymäki, Kimpankatu (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/169,524

(22) PCT Filed: Jan. 4, 2000

(86) PCT No.: PCT/FI00/00004
§ 371 (c)(1),
(2), (4) Date: Sep. 30, 2002

(87) PCT Pub. No.: WO01/49890
PCT Pub. Date: Jul. 12, 2001

(51) Int. Cl.⁷ .............................................. C22B 15/00
(52) U.S. Cl. ........................................ 75/10.35; 75/639
(58) Field of Search ................................ 75/639, 10.35

(56) References Cited

U.S. PATENT DOCUMENTS

| | | | |
|---|---|---|---|
| 2,506,557 A | 5/1950 | Bryk et al. | |
| 4,030,916 A | 6/1977 | Liniger | |
| 4,599,108 A * | 7/1986 | Hanniala | 75/643 |
| 5,565,016 A | 10/1996 | Hanniala et al. | |
| 6,042,632 A * | 3/2000 | George | 75/382 |
| 6,096,110 A * | 8/2000 | Mantymaki | 75/10.35 |

OTHER PUBLICATIONS

Victorovich et al, "Direct Production of Copper" Journal of Metals Sep. 1987 G.S. pp 42–46, vol. 39.

* cited by examiner

Primary Examiner—Melvyn Andrews
(74) Attorney, Agent, or Firm—Morgan & Finnegan, LLP

(57) ABSTRACT

The invention relates to a method of producing blister copper pyrometallurgically in a suspension reactor directly from its sulfidic concentrate. According to the method the copper sulfide concentrate is fed into a suspension reactor, into which cooled and finely ground copper matte is also fed in order to bind the heat released from the concentrate.

12 Claims, 2 Drawing Sheets

METHOD FOR THE PRODUCTION OF BLISTER COPPER IN SUSPENSION REACTOR

Figure 1:
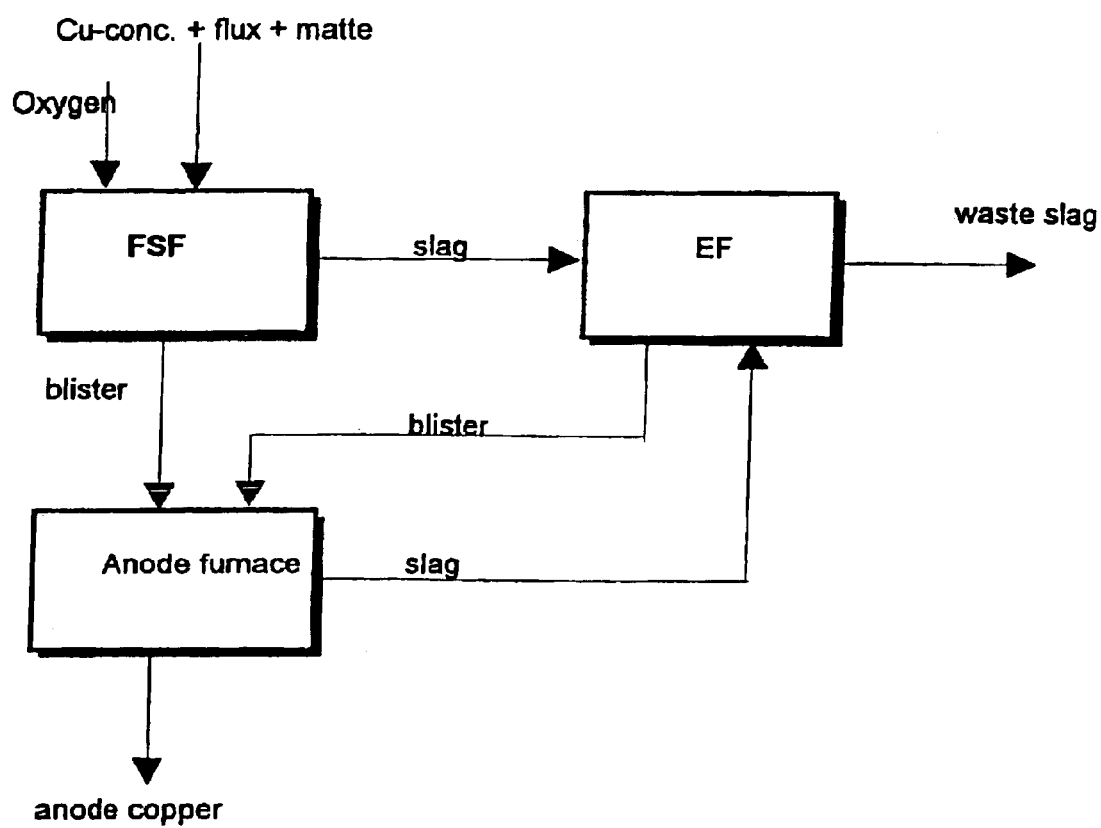

This invention relates to a method of producing blister copper pyrometallurgically in a suspension reactor directly from Its sulfidic concentrate. According to the method a copper sulfide concentrate is fed into a suspension reactor, into which cooled and finely ground copper matte is also fed in order to bind the heat released from the concentrate.

A well-known method of the prior art is to produce raw copper or blister copper from a sulfidic concentrate in several stages, whereby the concentrate is smelted in a suspension reactor, such as a flash-smelting furnace, with air or oxygen-enriched air, which results in copper-rich matte (50–75% Cu) and slag. This kind of method is described in e.g. U.S. Pat. No. 2,506,557. Copper matte formed in a flash-smelting furnace is converted in for example a Peirce-Smith type converter or flash converter into blister copper and refined further in an anode furnace.

The production of blister copper from sulfidic concentrate directly in one process step in a suspension reactor is economically viable within certain boundary conditions. The greatest problems involved in the direct production of blister include copper slagging to slag, the large amount of slag formed and the large amount of heat released on burning the concentrate. The large amount of slag requires a large smelting unit in surface area, which affects the investment costs of the process.

Besides the amount of slag, one problem arising in the direct production of copper is the large amount of heat formed in the burning of sulfidic concentrates, due to which the oxygen enrichment when burning normal concentrates (copper content 20–31% Cu) must be low, even under 50% oxygen, whereby the heating of the nitrogen in the process air balances the heat economy. This, however, results in a large amount of process gas, which in turn entails a large furnace volume and above all to large gas treatment units (boiler, electric precipitator, gas line, acid plant washing units etc.) In order to make these units related to gas handling a more economical size, the aim should be to get a high oxygen enrichment in the suspension reactor (over 50% $O_2$ in the process gas).

If the copper content of the concentrate is high enough, typically at least 37% Cu, as for example at the Olympic Dam smelter in Australia, where the copper content of the concentrate exceeds 50%, it is possible to produce blister directly in one stage, since the thermal value of the concentrate is usually lower the higher the copper content of the concentrate. In fact, at high copper content the proportion of iron sulfide minerals is low. When using the previously described concentrate, high enough oxygen enrichment can be used and, as a result the amounts of gas remain moderate.

Concentrate with a lower copper content can also be suitable for direct blister production, if it has an advantageous composition. For example, at the Glogow smelter in Poland, blister copper is produced from concentrate in one stage, since the iron content is low and the resulting amount of slag is not significantly high. The production of copper in one stage with normal concentrates causes slagging of all the iron and other gangues. This type of method is described in U.S. Pat. No. 4,030,915.

Now a new method has been developed to produce blister copper in a suspension reactor, in which method cooled and finely ground copper matte is fed into the suspension reactor with a concentrate in order to bind the heat released by the copper sulfide-containing concentrate and to reduce relatively the amount of slag. Copper matte is produced in a separate unit, cooled for example by granulating and then ground finely. By the term relative reduction in the amount of slag it is meant that a smaller amount of slag is generated with regard to the amount of blister copper produced than by the conventional method. By means of this method it is possible to use high oxygen enrichment in direct blister production and manage with smaller gas treatment units than earlier. In addition the total smelter capacity can be increased significantly without adding to the total amount of suspension reactor feed. The essential features of the invention will become apparent in the attached claims.

The basic concept behind the present method is that instead of the conventional method, where the additional heat is bound to the nitrogen in the gas, in this method the heat is bound to cooled matte. By adding cooled matte to the concentrate, the oxygen enrichment can be raised as the proportion of matte grow's both with poor and rich copper concentrates. If the proportion of cooled and finely ground matte in the feed is very great, the oxygen enrichment can be raised significantly even with poor concentrates and direct blister production made economically viable.

Another benefit of the method in the present invention is that the relative amount of slag generated in the suspension reactor decreases as the proportion of matte increases in the feed, whereby copper losses into slag decrease and the amount of copper circulated via slag cleaning also decreases. Iron silicate slag or calcium ferrite slag can be used in a blister furnace depending on the composition of the concentrate. If both matte and blister production take place in the same smelter so that the slag processing can be handled jointly, it is advantageous that both reactors use the same type of slag. If slag concentration is part of the slag processing then it is advantageous that the slag is iron silicate slag. The matte fed into the blister furnace may be matte produced in any kind of known smelting furnace.

A single suspension smelting unit may be designed directly as a blister smelter depending on the copper content and composition of the available concentrates and on the amount and composition of the available matte. The slags are treated further in single-stage or preferably two-stage slag cleaning. The two-stage cleaning method includes either two electric furnaces or an electric furnace and a slag concentrating plant. If the slags are treated in a slag concentrating plant, the slag concentrate can be fed back into the suspension reactor. Blister copper goes for normal refining in an anode furnace.

If two smelting units are available, at least one of which being a suspension smelting furnace, normal copper concentrates are handled in the matte producing unit. The matte produced is granulated and fed, finely ground, int the blister smelting unit together with the concentrate, whereby blister furnace concentrate is richer than normal (Cu content over 31%). Slag from a matte producing furnace is treated according to the prior art, for example, in a slag concentrating plant, and blister furnace slag is treated advantageously first in an electric furnace, from where the slag goes to the slag concentrating plant In this case too, blister furnace slag treatment can be single-stage.

Figure 2:
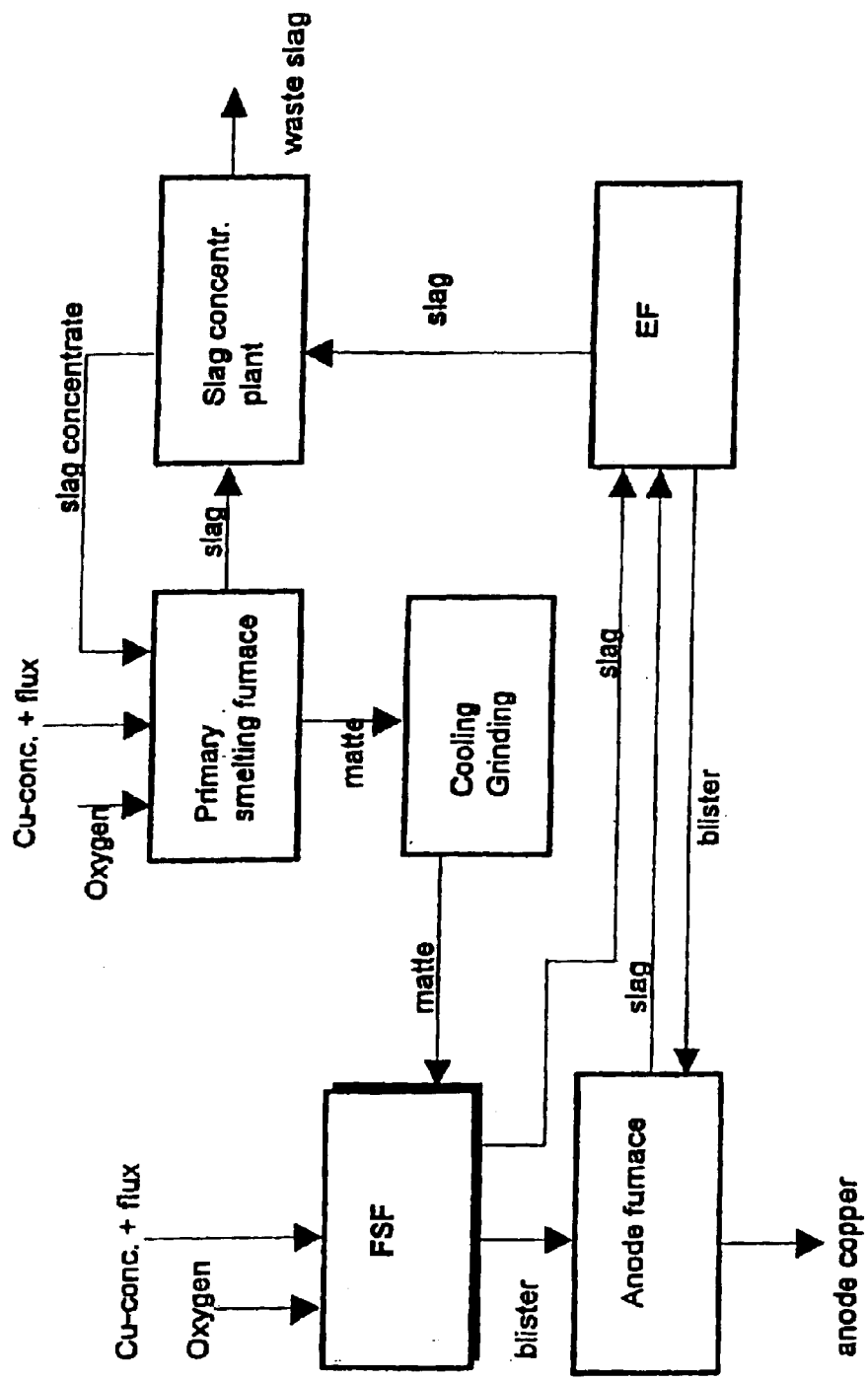

FIG. 1 shows a principle diagram of one arrangement of the invention, where one suspension smelting unit and an electric furnace are used, and FIG. 2 shows another, where two suspension smelting units, a slag concentrating plant and an electric furnace are used.

According to FIG. 1, the copper sulfide concentrate is fed with a flux and copper matte into the suspension smelting unit, which in this case is a flash-smelting furnace (FSF). It is marked on the diagram for the sake of simplicity that oxygen is fed into the furnace, but it is more often oxygen-nriched air. As stated earlier, it is advantageous that the oxygen enrichment is over 50%. Blister copper formed in a flash smelting furnace is conveyed to an anode furnace and refined there in the usual way and cast into anodes.

The slag from the flash smelting furnace is treated in an electric furnace, when the slag may be either calcium ferrite or iron silicate slag. The blister copper generated in the electric furnace is taken directly to the anode furnace and the small amount of slag generated in the anode furnace is taken to the electric furnace.

FIG. 2 shows a diagram according to the second alternative of the present invention, where there are two smelting units, one a blister furnace and th other where the copper matte to be fed Into the blister furnace is produced. In order to form copper matte, copper sulfide concentrate and silicate containing flux such as sand is fed according to the prior art into the reaction shaft of the primary smelting reactor of the process with oxygen or oxygen-enriched gas. In this case the reactor is a flash smelting furnace, but it could be some other reactor for the formation of matte. The concentrate to be fed Into this furnace is advantageously a poor or normal copper concentrate, with a copper content of around 20–31% Cu. Copper matte forms on the bottom of the lower section of the flash smelting furnace, th lower furnace, and on top of that fayelite slag, which contains some amount of copper.

Copper concentrate, which is a sulfide concentrate, is taken to the blister producing suspension reactor (FSF), but its copper content is preferably higher (Cu content over 31%) than the concentrate fed into the smelting furnace which produces matte. Thus, the sulfur and iron contents of the concentrate fed into the blister furnace are lower than the poorer concentrate and thus the thermal value of the concentrate is also lower than the concentrate fed into the matte producing furnace. The copper matte form d in the matte producing furnace is granulated, ground and fed with the copper concentrate, silicate containing flux and oxygen or oxygen-enriched air into the blister reactor, which is also advantageously a flash smelting furnace. Obviously not all the matte need come from the matte producing furnace, some of the matte may be produced elsewhere. Blister copper is produced in the blister furnace, ready to be fed into the anode furnace, where the raw copper is fed in molten state. The copper to be refined in the anode furnace is cast into copper anodes.

The slag formed in the matte producing smelting furnace is cooled slowly and ground. The slag is concentrated by flotation in a slag concentrating plant and the slag concentrate that is generated is taken back to the same matte producing smelting furnace. Since the copper content in the generated concentrate is often fairly high, it may also be conveyed to the blister furnace. The waste from the slag concentrating is waste slag, wit a Cu content of around 0.30–0.5%, preferably 0.3–0.35%.

Slag formed in the blister reactor (FSF) is taken advantageously to the electric furnace (EF) in molten state, for instance along channels. In the electric furnace, the slag is reduced with coke, and the blister copper produced in the furnace is transferred directly to the anode furnace. The slag generated in the anode furnace is also taken to the same electric furnace. The electric furnace slag is cooled slowly like the slag from the matte producing suspension smelting furnace and taken to the slag concentrator for treatment along with the slag from the matte producing smelting furnace.

EXAMPLE 1

Blister copper was produced in a suspension smelting furnace as shown in FIG. 1. The flash smelting furnace feed is 83.7 t/h, composed as follows: Concentrate 36.1 t/h, slag concentrate 2.2 t/h, flux 4.4 t/h, matte 35.4 t/h and flue dust 5.6 t/h.

The composition of the concentrate is:

| | |
|---|---|
| Cu % | 43.00 |
| Fe % | 14.00 |
| S % | 26.00 |
| $SiO_2$ % | 5.00 |

The $SiO_2$ content of the flux fed into the furnace is 90%. The analysis of the copper matte is as follows:

| | |
|---|---|
| Cu % | 70.00 |
| Fe % | 7.96 |
| S % | 21.34 |

The amount of oxygen fed into the furnace is 13 400 $Nm^3/h$ and the amount of air 4140 $Nm^3/m$, degree of oxygen enrichment is 74.6%.

35.6 t/h blister copper is produced in the flash, smelting furnace and its copper content is 99.41%. The amount of fayelite slag is 29.2 t/h and its composition is as follows: Cu 20%, Fe 28.7%, S 0.1% and $SiO_2$ 21%. The amount of gas exiting the furnace is 29 100 $Nm^3t/h$, the temperature 1320° C. and its analysis are: $SO_2$ 42.3% and $O_2$ 2.1%. The gas is routed to a waste heat boiler, from where the flue dust obtained is recirculated back to the flash smelting furnace.

Slag from the flash smelting furnace and from the anode furnace are treated together in the electric furnace, whereby the amount of slag from the FSF is 701 t/h, Cu content 20% and the amount of slag from the anode furnace is 4.5 t/h and Cu content 60%. The coke feed is 30 t/h. The amount of blister copper produced in the electric furnace is 121 t/h and Cu content 99.35%. The blister copper is taken to the anode furnace for refining with the blister copper from the flash smelting furnace. The amount of slag is 557 t/h and the Cu content 4%. Since its Cu content is so high, the slag is conveyed for further processing to the slag concentrating plant. As a result of flotation concentration the slag concentrate has a Cu content of 38.4% and the waste slag a Cu content of 0.38%.

EXAMPLE 2

This example case describes the solution shown in FIG. 2. The material amounts of the feed and the output are calculated per 1000 kg concentrate fed into the primary smelting furnace. The primary smelting furnace in this case is a flash smelting furnace.

1000 kg concentrate is fed into the primary smelting furnace, composed as follows:

| | |
|---|---|
| Cu | 31% |
| Fe | 25% |
| S | 31% |

The amount of flux sand, fed into the furnace is 88 kg, slag concentrate 70 kg and circulated precipitates 22 kg. The total furnace feed is thus 1180 kg, as dust circulation is not taken into account here. 172 Nm³ air and 157 Nm3 oxygen are fed into the reaction shaft of the furnace, so that the oxygen enrichment is 57%.

The amount of matte generated in the smelting furnace is 464 kg and its composition is Cu 70%, Fe 7.0% and S 21.2% and temperature 1280° C. The amount of slag is 568 kg, and its composition: Cu 2.6%, Fe 42%, S 0.7% and $SiO_2$ 27% and temperature 1320° C.

The matte formed in the primary smelting furnace is granulated, ground and the ground matte is fed into the suspension sm liting furnace in order to bind the heat generated in the furnace. In order to form blister, concentrate is fed into the furnace, with the following composition: Cu 38%, Fe 29% and S 26% and 214 kg in amount. The flux which is again sand, is fed 44 kg in amount. Thus, the total feed is 710 kg, when th loss forming in grinding is taken into account. 50 Nm³ air and 111 Nm³ oxygen is fed into the blister furnace, so the oxygen enrichment is 72%.

The amount of raw copper formed in the suspension smelting furnace, in this case a flash smelting furnace, is 362 kg and its Cu content 98.8% and S content 0.6, with a temperature of 1280° C. The amount of slag forming in the flash smelting furnace is 239 kg and its composition is Cu 20%, Fe 31.2%, S 0.1% and $SiO_2$ 21% and temperature 1300° C.

The slag from the blister furnace is routed to the electric furnace in the same way as the slag from the anode furnace, where the amount of the slag is only 3kg and Cu content 60%. 10kg of coke is added. 44 kg of blister forms in the electric furnace, with a 96% Cu content. The amount of slag in the electric furnace is 188 kg and its composition is as follows: Cu 4%, Fe 27.3%, S 4.8% and $SiO_2$ 17.6% .

Slag coming from both the primary smelting furnace and the electric furnace is cooled slowly and routed to the slag concentrator for processing. After flotation concentration, the contents of the slag concentrate are: Cu 29.3%, Fe 27.3%, S 4.8% and $SiO_2$ 17.6%. The analysis of the waste slag is as follows: Cu 0.3%, Fe 43% and $SiO_2$ 27.9%.

What is claimed is:

1. A method of producing blister copper in a suspension reactor directly from a sulfidic copper concentrate, comprising feeding the concentrate, flux and oxygen-enriched air into the reactor and heating them to produce slag and blister copper, feeding cooled and finely-ground copper matte into the suspension reactor along with the concentrate in order to bind heat released from the concentrate and to decrease the amount of slag formed relatively, the degree of oxygen enrichment of the air fed to the reactor being at least 50%, and processing the slag from the blister copper producing suspension reactor into blister copper and waste slag in two stages.

2. A method according to claim 1, wherein the copper content of the concentrate fed to the suspension reactor is at least 31%.

3. A method according to claim 1, wherein the suspension reactor is a flash smelting furnace.

4. A method according to claim 1, wherein the slag from the blister copper producing suspension reactor is processed first in an electric furnace and the slag obtained from there is cooled slowly and conveyed to the slag concentrating plant together with the slag from the matte producing reactor for joint processing.

5. A method according to claim 1, wherein the slag from the blister copper producing suspension reactor is processed in an electric furnace (EF) and the slag from the electric furnace is processed in a slag concentrating plant.

6. A method according to claim 5, wherein the slag from the electric furnace is cooled slowly and processed in a slag concentrating plant, from where the slag concentrate is conveyed to the suspension reactor and that the slag is waste slag, with a copper content of 0.3–0.5% Cu.

7. A method according to claim 1, wherein the slag from the blister copper producing suspension reactor is processed in two electric furnaces.

8. A method according to claim 1, wherein the copper matte fed into the suspension reactor is formed in a matte producing reactor and the copper content of the concentrate fed into the latter is 20–31% Cu.

9. A method according to claim 8, wherein the matte producing reactor is a suspension smelting furnace.

10. A method of producing blister copper in a suspension reactor directly from a sulfidic copper concentrate, comprising feeding the concentrate, flux and oxygen-enriched air into the reactor, feeding cooled and finely-ground copper matte into the suspension reactor along with the concentrate in order to bind heat released from the concentrate and to decrease the amount of slag relatively, the degree of oxygen enrichment of the air fed to the reactor being at least 50%, forming the copper matte fed into the suspension reactor in a matte producing reactor, the copper content of the concentrate fed into the latter being 20–31% Cu., cooling slag from the matte producing reactor is slowly and processing the slag in a slag concentrating plant to obtain a slag concentrate, conveying the slag concentrate obtained to the matte producing reactors, the slag being waste slag, with a copper content of 0.3–0.5% Cu.

11. A method of producing blister copper in a suspension reactor directly from a sulfidic copper concentrate, comprising feeding the concentrate, flux and oxygen-enriched air into the reactor, feeding cooled and finely-ground copper matte into the suspension reactor along with the concentrate in order to bind heat released from the concentrate and to decrease the amount of slag relatively, the degree of oxygen enrichment of the air fed to the reactor being at least 50%. Forming the copper matte fed into the suspension reactor in a matte producing reactor, the copper content of the concentrate fed into the latter being 20–31% Cu, cooling slag from the matte producing reactor slowly and processing the slag in a slag concentrating plant to obtain a slag concentrate and waste slag, conveying the slag concentrate obtained to the blister copper producing suspension reactor, waste slag having a copper content of 0.3–0.5% Cu.

12. A method according to claim 11, wherein the matte producing suspension smelting furnace is a flash smelting furnace.

* * * * *